INVENTOR.
EARL W. CARSON
RICHARD E. DERR
MARLOWE W. IVERSON

ATTORNEY.

INVENTOR.
EARL W. CARSON
RICHARD E. DERR
MARLOWE W. IVERSON

ATTORNEY.

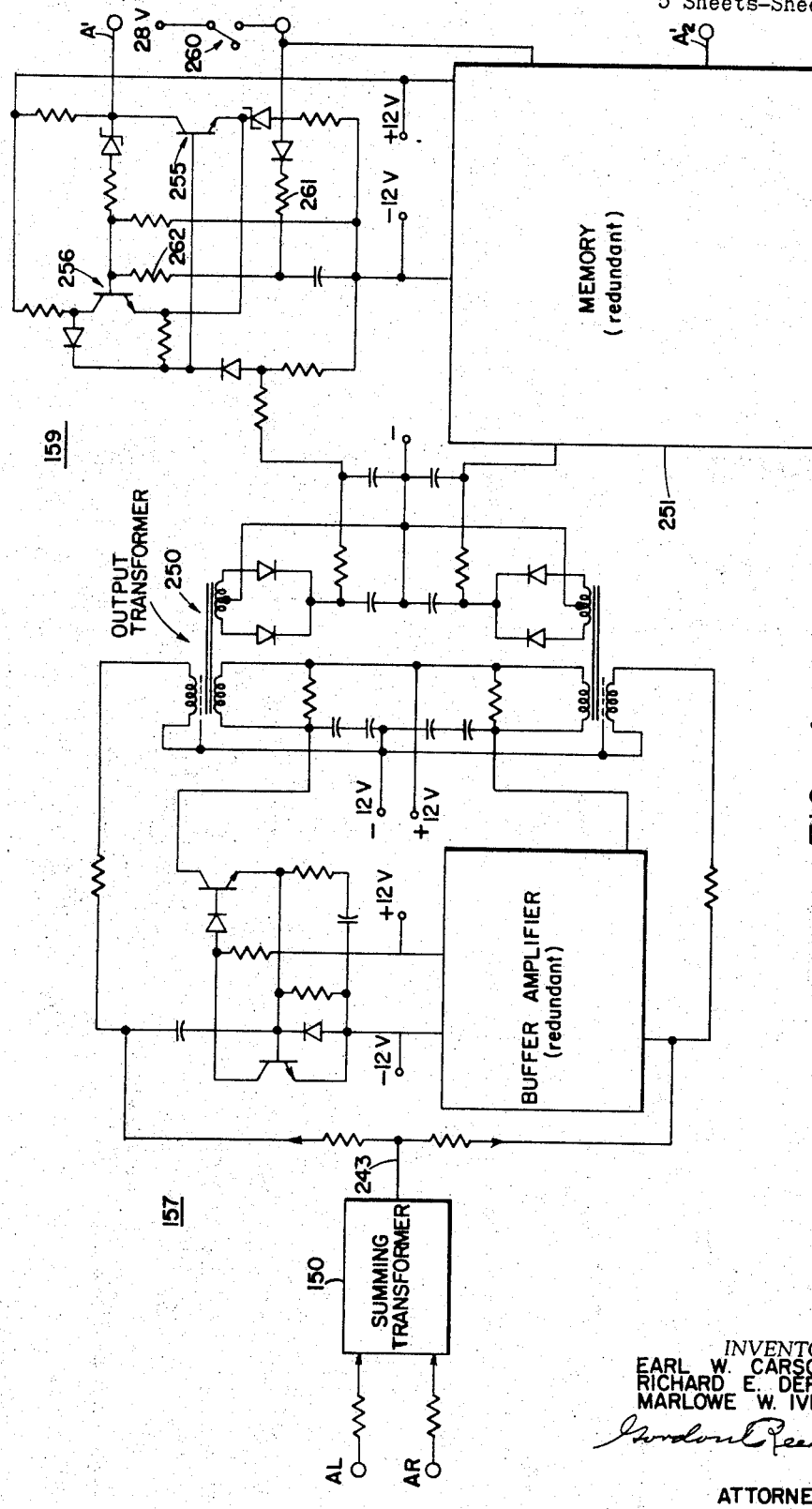

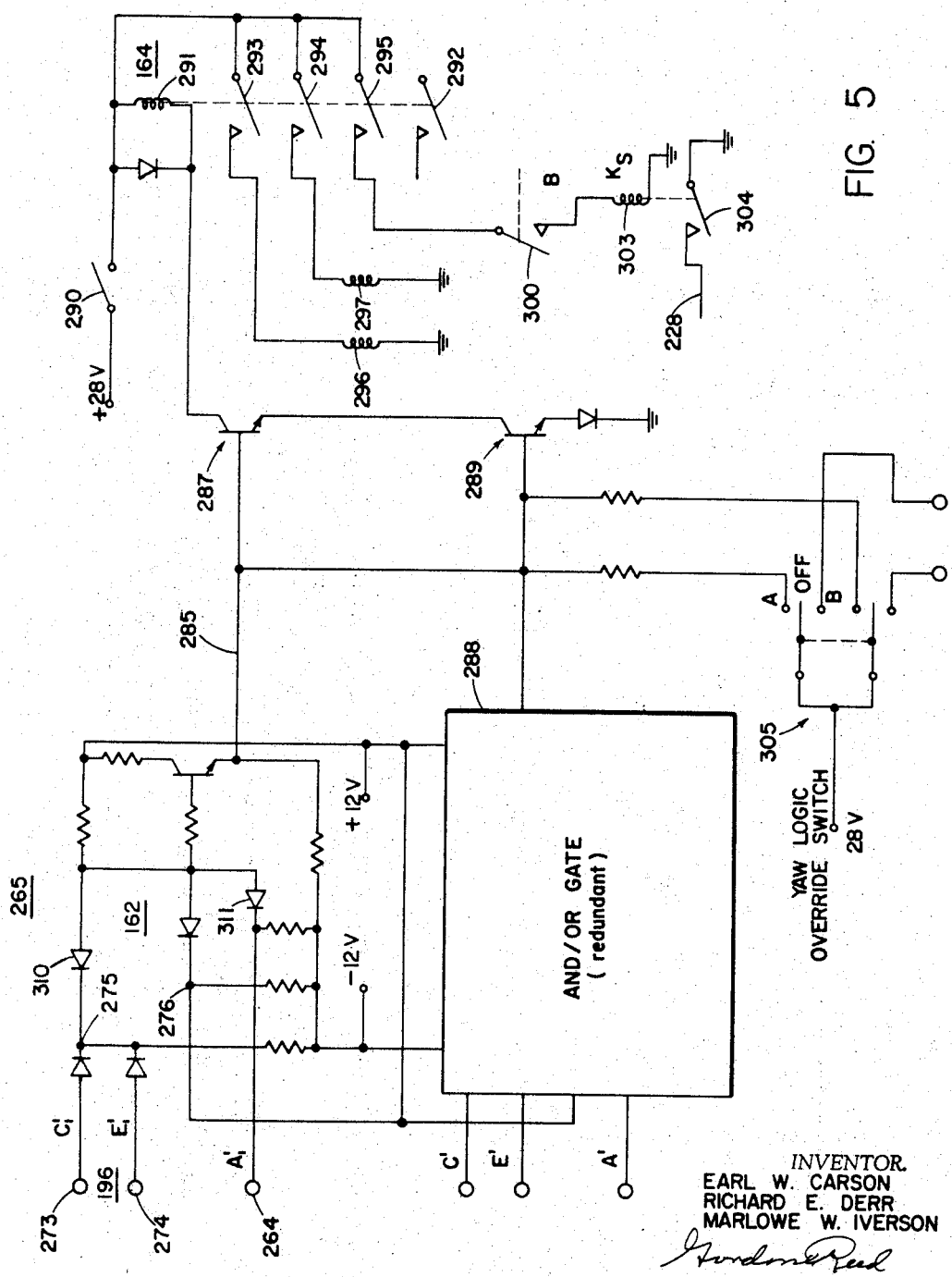

3,351,315
CONTROL APPARATUS
Earl W. Carson, Minneapolis, Richard E. Derr, St. Paul, and Marlowe W. Iverson, Minneapolis, Minn., assignors to Honeywell Inc., a corporation of Delaware
Filed Feb. 2, 1962, Ser. No. 170,695
15 Claims. (Cl. 244—77)

This invention pertains to control apparatus for controlling a condition and more particularly relates to a stability augmentation system for controlling an aircraft in flight about one of its control axes.

While stability augmentation systems have been heretofore provided, an object of this invention is to provide an improved augmentation system with a high degree of reliability.

A further object of this invention is to provide an improved augmentation system wherein the reliability improvement is achieved using redundant channels.

A further object of this invetnion is to provide in a redundant channel stability augmentation system an automatic monitor effective on failure of a chanel to delete or render ineffective for control purposes of the craft the failed channel.

A further object of the invention is to permit the pilot of the aircraft to override the automatic monitor under certain failure conditions.

The above and further objects and advantages of my invention will appear hereinafter from a consideration of the following description and accompanying drawings illustrating a preferred embodiment thereof.

In the drawings:

FIGURES 4 and 5 comprise an electrical schematic of the monitoring and disengage arrangement of FIGURE 2.

While we have shown our invention applied for purposes of illustration to the yaw channel of an aircraft, it is to be understood that it is also applicable either to the pitch channel or to the roll channel of the craft or to control system generally using a condition control device. The yaw axis control system consists of a dual channel yaw stability augmentation system and a third or monitor channel wherein there are duplicates of the gyro, accelerometer, and electronics of the other two channels. For purposes of identification, one dual channel is referred to as the A channel, the other as the B channel and the monitor channel is referred to as the M channel.

The yaw axis stabilization system herein utilizes two completely separate active channels operating on four servomotors connected in a series (often termed differential) arrangement.

Thus two servomotors are connected, for each of the two rudders of the craft, in a differential or whiffle-tree arrangement. A third or monitoring channel duplicates the rate gyro, the lateral accelerometer, and the electronics employed in the first two channels, to provide a voting system.

In the event of a failure in channel A or channel B, the comparator or decision device of the monitoring arrangement disengages the faulty channel and concurrently raises the gain of the remaining active channel to compensate for the narrowed or reduced mcehanical gain through the differential or whiffle-tree arrangement.

Provisions are included in the system to permit the pilot, following the occasion of a failure, to reset or recycle the apparatus if a temporary failure only has occurred.

Figure 1:
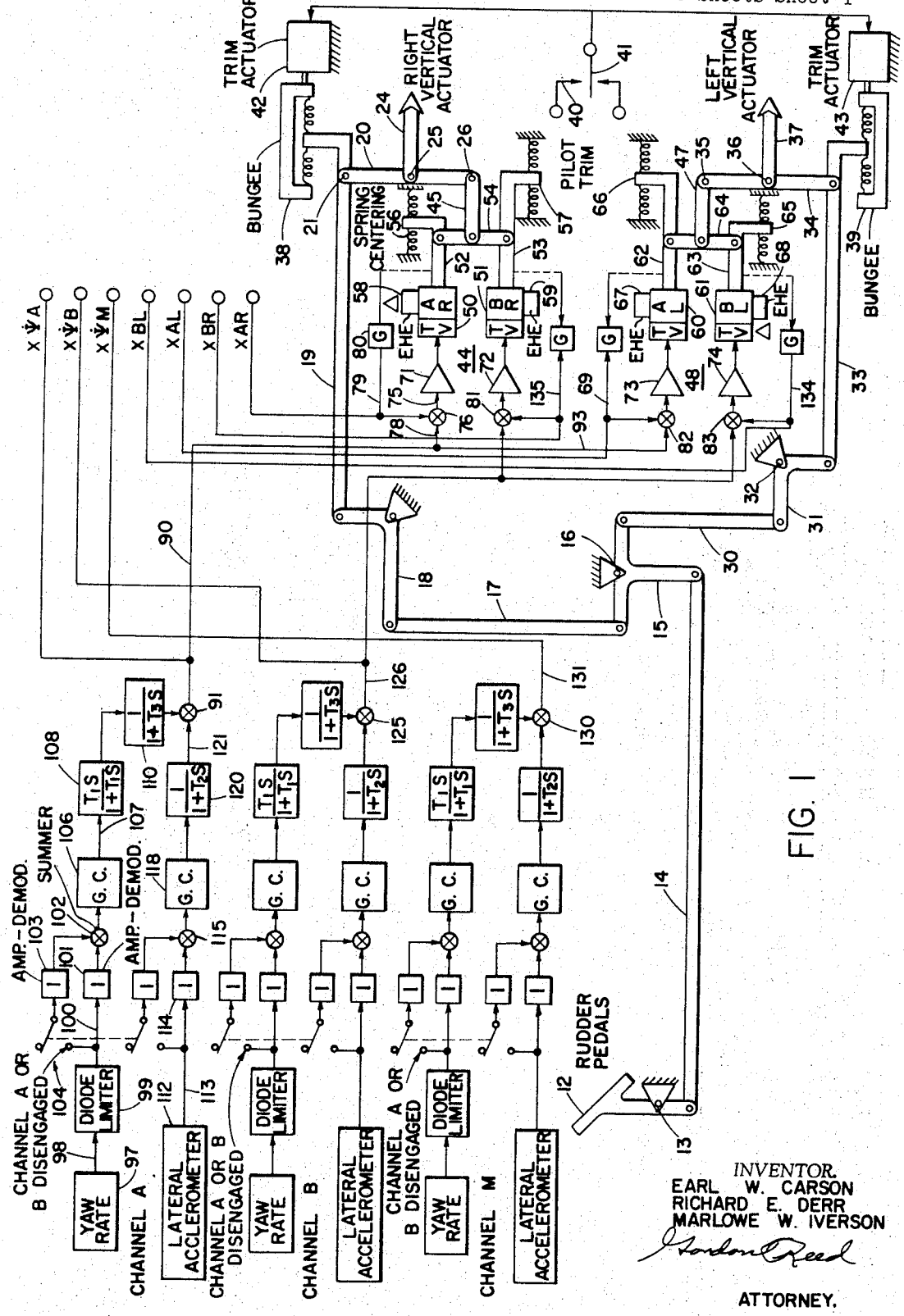
FIGURE 1 is a block diagram of a redundant channel stability augmentation system applied to the yaw axis of an aircraft.

Referring to FIGURE 1, rudder pedals such as rudder pedal 12 in an aircraft and which pedal is pivoted on the craft at 13 operates through a connecting link 14, three armed lever 15, link 17, bell crank lever 18, link 19, differential lever 20 pivoted at 26 to position an output member 24 pivoted at an intermediate point 25 on the differential lever 20. The output member 24 may be used to position directily or through a boost actuator a right rudder of an aircraft.

Operation of three armed lever 15 is also transmitted through link 30, bell crank lever 31, pivoted on the craft at 32, link 33, differential lever 34, on pivot 35, having an intermediate point 36 thereof from which extends a second output member 37 which may directly or through a boost actuator position a left rudder surface of an aircraft. The operation of link 19 is opposed by a Bungee apparatus 38 on the aircraft and similarly the operation of link 33 is resisted by a Bungee arrangement 39 on the craft. By means of a switching arrangement 40 having a pilot trim operable arm 41, a trim actuator 42 and a trim actuator 43 may be operated to alter the normal biasing point of links 19 and 33 respectively.

Coacting with the differential lever 20 at pivot 26 through its output link 45 is one series servo arrangement 44; and coacting with differential lever 34 at pivot 35 through its output link 47 is a second differential or series servomotor arrangement 48, so-called because operation of links 45 or 47 is not reflected back as to cause movement of pedal 12.

Differential arrangement 44 comprises a first hydraulic or fluid servomotor 50, a second hydraulic servomotor 51 with the servomotor having their respective output members 52, 53 connected to opposed ends of a link 54 which in turn has its mid-point connected to link 45 extending to pivot 26 on differential lever 20. The servomotor 50 is biased to normal centered position through an internal spring centering arrangement illustrated for simplification here as arrangement 56, and similarly the servomotor 51 also when rendered ineffective is biased to a normal centered position and locked therein by an internal spring centering arrangement represented herein by arrangement 57.

Differential servomotor arrangement 48 comprises a hydraulic servomotor 60, a hydraulic servomotor 61, the hydraulic servomotors having their respective output members 62, 63 connected to opposed ends of a link 64 having an intermediate point thereof connected to link 47 extending to pivot 35 on differential lever 34. The servomotors 60, 61 similarly to motors 50, 51 have respective centering means 66, 65 for centering and locking the servomotors upon such servomotor being rendered ineffective for operation.

Each of the servomotors is rendered effective for control operation by an electrohydraulic engage valve (E.H.E.) upon energization thereof. Thus servomotor 50 has an engage valve 58, motor 51 has an engage valve 59, motor 60 has an engage valve 67, and motor 61 has an engage valve 68. When the servomotors are rendered effective for operation, such operation is controlled by their respective amplifiers 71, 72, 73 and 74.

The general type of hydraulic servomotors, the means for rendering each servomotor effective, and the means such as transfer valves (TV) shown for controlling operation of such servomotor when rendered effective for operation as thus far described are old in the art and may be of the type disclosed in the patent to Schurr No. 2,952,424.

While the patent shows a different arrangement of the servomotor having servomotor 14 therein associated with a manually controlled end 12, it is to be understood that in the present use of a servomotor of this type only the autopilot section 14 will be utilized. Furthermore the body or housing of such servomotor instead of being pivoted on the craft as at 15 in the patent will be fixed relative to the craft for rectilinear movement of its output member such as the piston rod. Such servomotor as in the patent has a solenoid operated valve 65 for preconditioning or rendering the servomotor effective for subsequent control or operation. When valve 65 is deenergized, spring 55 centers and locks the servo output member 16. The operation of servo 14 is achieved through the positioning of a pilot valve 40 from a normal position. Valve 40, which may be considered a transfer valve is differentially positioned in one direction or the other by the output from an amplifier. Such amplifier as 72 of the patent corresponds with the amplifiers 71, 72, 73 and 74 herein.

Amplifier 71 receives a control signal from conductor 75 extending from a summing device 76. Device 76 provides a resultant signal obtained from one signal on conductor 78 representing responses of the craft to changes while in flight and a servo displacement signal on transmitting means 79 received through a gain device 80 from displacement of the output member 52 of servomotor 50. Similar summing devices 81, 82 and 83 and sources of control signals are provided for amplifiers 72, 73 and 74 respectively.

It will be noted that the same input signal supplied by conductor 78 to summing device 76 is also supplied via subconductor 93 to summing device 82. Consequently there is a pair of servomotors, as 50 and 60, in each differential arrangement 44, 48 controlled by the same input control signal.

The signal on input conductor 78 which corresponds with the signal derived from the response of the craft to various flight conditions is in turn derived from a conductor 90 extending from a summing device 91.

Summing device 91 supplies to conductor 90 an output signal from a channel A of the yaw stability augmenter apparatus. Channel A comprises a yaw rate sensing device 97 such as a conventional yaw rate responsive gyroscope which provides on conductor 98 an alternating signal voltage of a magnitude dependent upon the rate of yaw of the craft and of a phase depending upon the direction of yaw of the craft. The AC signal on conductor 98 is supplied through a conventional diode limiter 99 which limits the magnitude of the signal transmitted over conductor 100 to an amplifier-demodulator 101. The AC input is thereby converted to a DC output and supplied to a summing device 102. Summing device 102 under circumstances to be described additionally receives the output of a second amplifier-demodulator 103 which is connected at times through switching arrangement 104 to conductor 100.

The arrangement of the two amplifier-demodulators 101 and 103 in parallel with switching arrangement 104 in the opposite position from that shown is representative of a doubling in gain of amplifier-demodulator 101 upon disengagement of either active channel, to be described.

The output from summing device 102 is supplied through a gain control device 106 having the DC output therefrom supplied by conductor 107 to a high pass network 108 which blocks control signals of low frequency. The output from network 108 is supplied in turn to an aeroelastic filter 110 represented as a lag device and the output from the aeroelastic filter is supplied to summing device 91.

Channel A also includes an accelerometer sensing lateral accelerations of the craft which derives an AC signal of a magnitude in accordance with the magnitude of the lateral accelerations of the craft and of a phase depending upon the direction of acceleration. The output from lateral accelerometer 112 is transmitted through conductor 113 to amplifier-demodulator 114 having its DC output supplied to summing device 115 which in turn through gain control device 118, passive leg device 120, and conductor 121 supplies the other input to summing device 91. The output of the device is a composite signal identified as $X\Psi A$.

The yaw stability augmenter additionally includes as a source of control signals a chanel B having a yaw rate sensor and lateral accelerometer sensor similar to channel A and having the elements following such yaw rate sensor and lateral accelerometer corresponding to channel A so that the control signals are supplied to summing device 125. The composite signal $X\Psi B$ from device 125 is transmitted through conductor 126 to summing arrangement 81 which controls servomotor amplifier 72 and which is also supplied through summing device 83 which through servoamplifier 74 controls servomotor 61.

It is thus evident that a servomotor 51 in differential arrangement 44 and a servomotor 61 in differential arrangement 48 are also controlled by a common resultant aircraft flight condition electrical control signal.

As thus far described, the apparatus provides a stability augmentation system for an aircraft in yaw, but the primary features of the invention pertain to a monitoring arrangement for such augmentation system. The description of such monitoring arrangement will now be considered. The stabilization system includes a third channel M signifying a monitoring channel. This channel duplicates the yaw rate sensing device and the lateral accelerometer sensing device plus the associated electronics included in channels A and B previously described. The arrangement is such that at a summing device 130 in the M channel there is a resultant control signal $X\Psi M$ applied to conductor 131.

It will be noted that there are three devices sensing the same aircraft flight condition such as yaw rate and three flight condition sensing devices sensing a second flight condition such as lateral acceleration. Since each channel thus duplicates these members as well as following elements, the outputs from summing devices 91 and 125 and 130 should ordinarily be the same. The output from summing device 91 as stated is referred to as $(X\Psi A)$; the output from summing device 125 is referred to as $(X\Psi B)$; and the output from summing device 130 is referred to as $(X\Psi M)$. Also the displacement of servomotor 50 derived from the servo displacement followup signal conductor 79 represented as (XAR) should be the same as the electrical signal derived from operation of the servomotor 60 appearing on servo displacement followup conductor 69 and represented as (XAL) since the two servomotors 50, 60 receive a common control signal. Also, the electrical followup signal (XBL) on servo followup conductor 134 of servomotor 61 should be the same as the electrical signal (XBR) on followup conductor 135 of servomotor 51. The above seven signals are utilized in a monitoring arrangement shown in block form in FIGURE 2.

Figure 2:
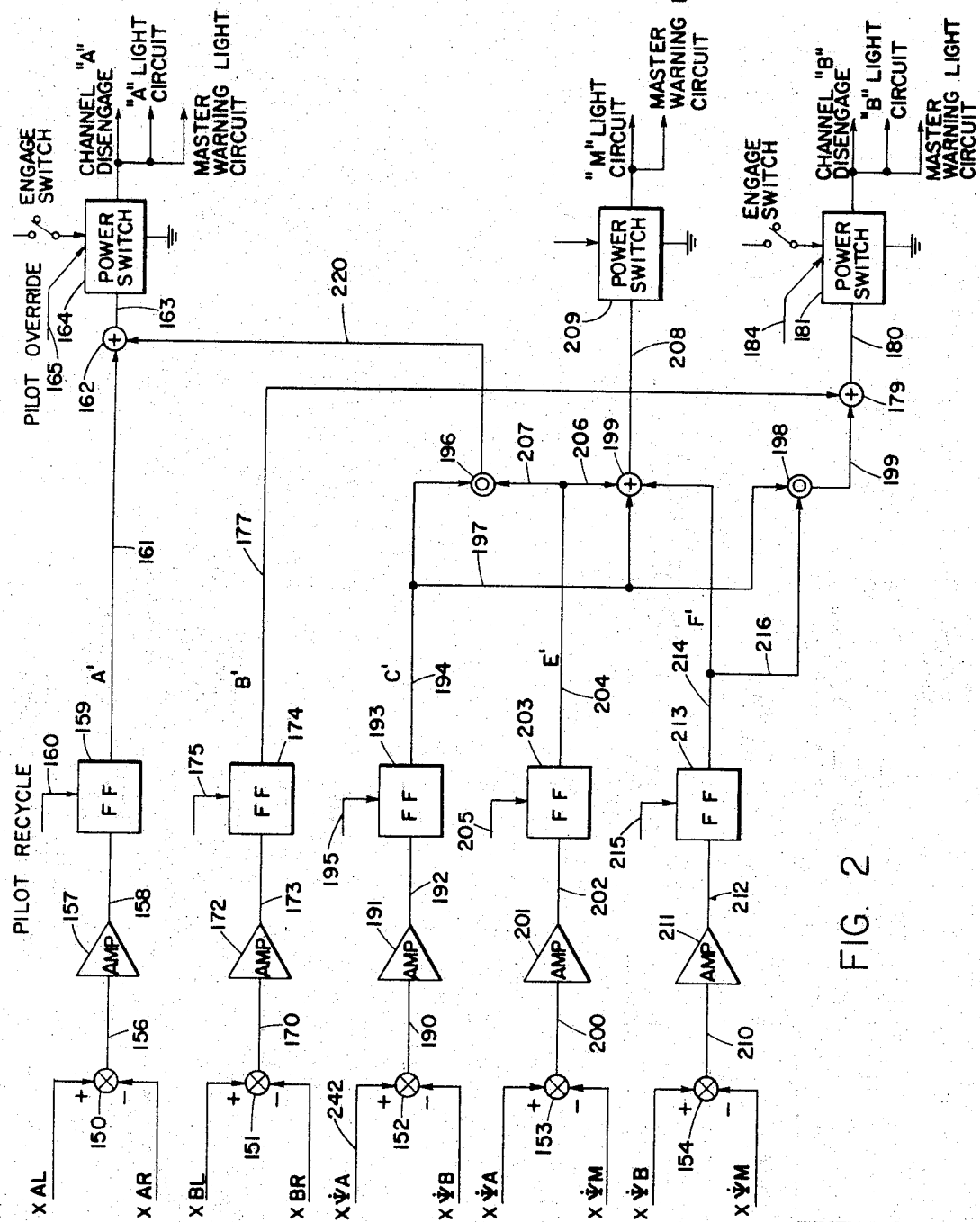
FIGURE 2 is a block diagram of the monitoring apparatus of the system of FIGURE 1 for controlling disengagement of a failed channel.

In FIGURE 2 there are shown five summing devices 150, 151, 152, 153 and 154. Summing device 150 receives servo displacement signals XAL and XAR and the algebraic signs of these signals are always in opposition. The output from summing device 150, if any, is applied through conductor 156 to buffer amplifier 157, which may be a two-stage transistor amplifier. Ordinarily the two opposed signals to device 150 are equal, and thus no input control signal or error signal is supplied on conductor 156.

The output from amplifier 157 is supplied via conductor 158 to a bistable device here called a memory circuit or flip-flop 159. Devices of this type are bistable, and they are often used in high speed counting devices. They may be either of the transistorized type or the vacuum tube type. The output from the memory device 159 which is a DC voltage level is supplied over conductor 161 to a switching logic, OR gate, as indicated by the ⊕ symbol. Upon such actuation of the OR gate 162 due to an error signal its operation is applied through conductor 163 to a power switch 164 controlling a main engage circuit. Thus upon an output of such type from OR gate 162 due to the error signal, the servomotors AL and AR are rendered ineffective, centered and locked or disengaged. In other words the A channel is disengaged, and indicating means such as a function selector A light (not shown) and an aircraft master warning light (not shown) are energized. The monitoring arrangement thereby shows a faulty operation or malfunction in the A channel.

Similarly the summing device 151 has applied thereto the B channel left and right servo displacement signals, and if there be a difference or error signal, the difference is applied over a conductor 170 in the form of an electrical signal to buffer amplifier 172. Amplifier 172 in turn has its output supplied over conductor 173 to the bistable device of flip-flop (FF) 174. The output from the device 174 which is in the form of a DC voltage level due to the error signal is applied over conductor 177 to a second OR switching logic 179. The output from the OR switching logic 179 is supplied over conductor 180 to power switch 181 causing disengagement of the B channel servomotors, in a manner more particularly to be described.

While the monitoring arrangement as thus far described in FIGURE 2 effects the monitoring of the displacement of the four series servomotors operating the two rudder surfaces of an aircraft, in the following, the flight condition sensors and electronics which sense the flight conditions of an aircraft and supply control signals are monitored. In the sensor operation monitoring arrangement as distinct from the servo operation monitoring arrangement, summing device 152 has applied thereto for simple terminology an A channel composite control signal and a B channel composite control signal of opposite polarity and any difference in these signals when algebraically summed is supplied over conductor 190 to amplifier 191. Amplifier 191 has its output supplied by conductor 192 to bistable or memory circuit or flip-flop device 193 which in turn through conductor 194 has its output supplied to a switching logic AND device 196 represented by the symbol ⊙. By means of a sub-conductor 197 extending from conductor 194, the output of memory device 193 is additionally supplied to an OR switching logic device 199 and to a second AND switching logic device 198.

Summing device 153 has applied thereto the composite control signal from the A channel and the composite control signal from the M channel and the difference between such signals is supplied over conductor 200 to amplifier 201 having its output in turn supplied over conductor 202 to memory device or flip-flop 203. Memory device 203 through conductor 204 has its output supplied in one instance to the OR switching logic device 199 and through conductor 207 to the AND switching logic device 196. The output of the AND switching logic device 196 is supplied over conductor 220 to the OR switching logic device 162.

The summing device 154 has supplied thereto the B channel composite control signal and the M channel composite control signal and any difference between the signals as algebraically summed is supplied over conductor 210 to amplifier 211 having its output supplied over conductor 212 to flip-flop device 213. The output from the bistable device 213 is supplied over conductor 214 to the OR switching logic device 199. Device 199 as represented has three inputs, and the output from the logic device 199 is transmitted over conductor 208 to the power switch 209 which controls the circuit for an M light and also a master warning light circuit of the aircraft.

Bistable device 213 which as stated has its output supplied over conductor 214 to the OR switching logic device 199 also through a subconductor 216 has its output supplied to AND switching logic device 198. The output from the AND switching logic device 198 is supplied by conductor 199 to the OR switching logic device 179 which in turn through conductor 180 controls the power switch 181.

The switching logic devices as represented in FIGURE 2, as implied by the terms applied to them, control the power switches 164, 181, 209. The switching logic OR device 162 as represented in FIGURE 2 may be operated either from conductor 161 or conductor 220 whereas AND switching logic device 196 will not be operated unless a control is supplied concurrently from conductors 194 and 207. Similarly the OR switching logic device 199 will supply an output if a control is supplied thereto from either one of conductors (194, 197); (204, 206); or 214. Also the AND switching logic device 198 will supply an output to conductor 199 only if concurrently receiving a control from conductors 197 and 216. Also the OR switching logic device 179 will supply an output if a control input is supplied thereto from either conductor 177 or conductor 199.

It is noted that the bistable or memory devices 159, 174, 193, 203 and 213 have pilot recycle controls 160, 175, 195, 205 and 215, to be described, respectively to restore the initial conditions of these bistable devices.

Also the power switches 164 and 181 are provided with manual or pilot override controls 165, 184 to permit the pilot to override the switching logic and maintain the servomotors in the A channel or the servomotors in the B channel operative to override any control supplied to conductors 163 or 180.

Summarizing the monitoring arrangement, the logic failure equations pertaining to FIGURE 2 it should be noted may be stated thus, assuming that the primed letters A′, B′, C′, E′, F′, therein indicate the normal state, unprimed letters the failed state: A channel failure = $A+(CE)$ wherein the plus sign + is interpreted in the logic switching as OR, thus going from A′ to A or going simultaneously from C′ and E′ to C and E; B channel failure = $B+(CF)$; M channel failure = $C+E+F$.

Figure 3:
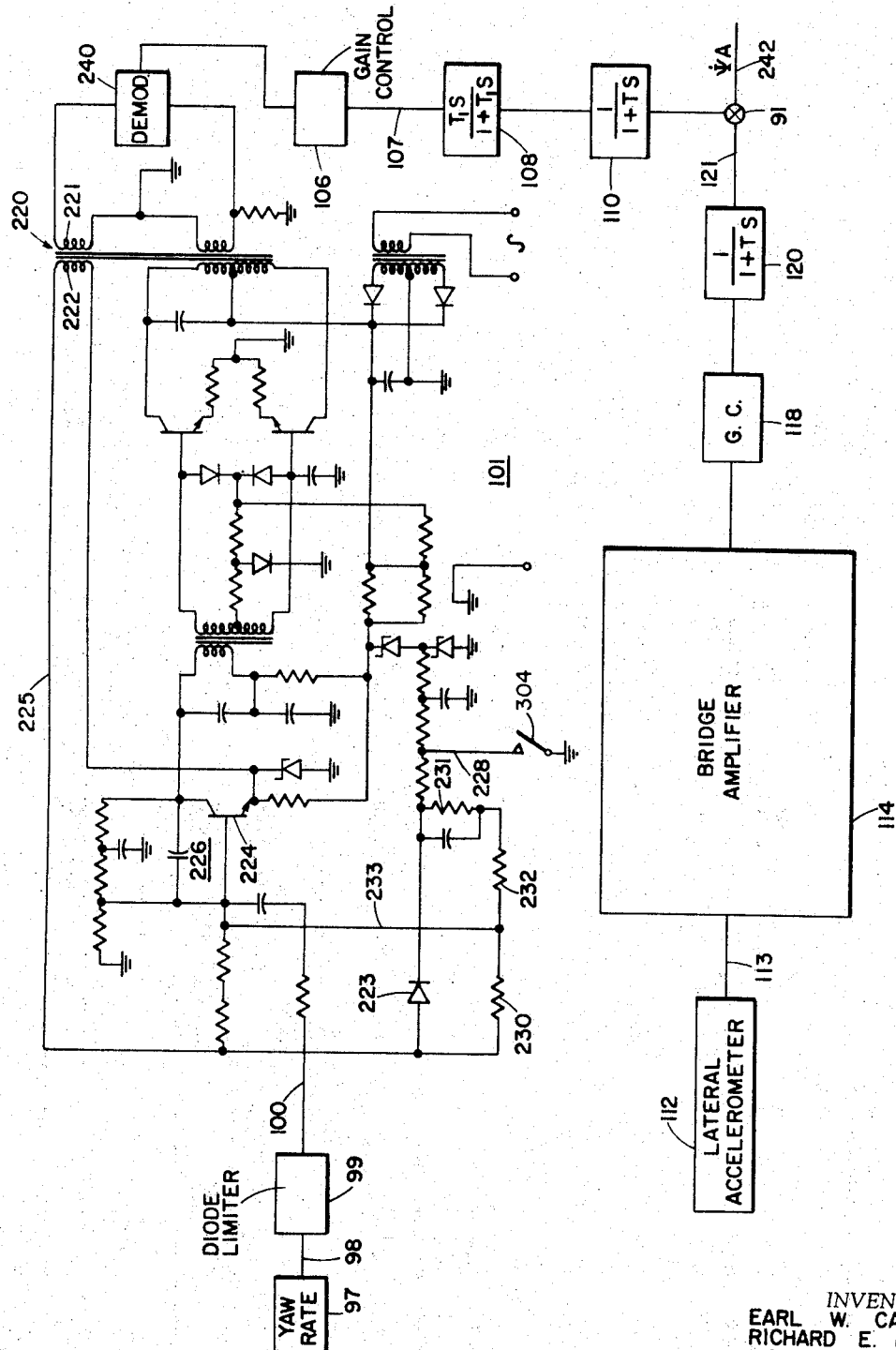
FIGURE 3 is an electrical schematic of a portion of the redundant channel stabilization system of FIGURE 1.

Reference is now made to FIGURES 3, 4 and 5 wherein the electrical schematic of the entire stabilization and monitoring arrangement is provided. The description hereinafter will be concerned primarily with the monitoring or fail safety provisions in the yaw stabilization augmentation system. This view or position is taken on the basis that the operation of the augmentation system of FIGURE 1 as thus described is clear to one skilled in the art in that deriving a yaw rate and a lateral acceleration signal from AC pickoffs, amplifying such signals and converting them to two DC voltages and passing them through various filter networks and wherein such DC signals are used to control a servoamplifier that operates a series type hydraulic servomotor having a feedback to proportion its operation extent to the input signal, involves no new techniques.

However, a portion of the arrangement in FIGURE 1 pertinent to the monitoring apparatus and portions of FIGURE 2 intimately related to such monitoring provisions are shown in electrical schematic detail of some components and described hereinafter. Further, inasmuch as the A, B and M channels shown in FIGURE 1 have duplicate sensors and similar components, merely one of such channels will be described with respect to the detailed feature involved in the monitoring apparatus.

Referring to FIGURE 3 a yaw rate responsive device such as a yaw rate gyroscope 97 supplies an AC signal on conductor 98 to the diode limiter 99 which limits the magnitude of the yaw signal supplied by conductor 100 to the bridge amplifier 101. Amplifier 101 is shown in detail since portions thereof coact with the monitoring arrangement. Amplifier 101 is an AC amplifier having transistor elements instead of vacuum tube elements therein. The monitoring arrangement is concerned with a feedback arrangement effected through transformer 220 with gain changing provisions. The feedback arrangement comprises a feedback transformer 220 having a primary winding 221 and secondary winding 222. The voltage on secondary winding 222 derived from the output of the amplifier is fed back through conductor 225 and various impedance paths to the base member 224 of a transistor element 226. The gain of the amplifier 101 is controlled by causing the feedback on conductor 225 to pass through a high or a low impedance path. This is achieved by selectively connecting a conductor 228 to ground through relay contacts 304. When conductor 228 is connected to ground, diode 223 is so biased as to be conducting, and the feedback path from conductor 225 is through diode 223, resistor 231, resistor 232, conductor 233 to base element 224 of transistor 226. However, when the ground is removed from conductor 228, diode 223 is reverse biased and is at this time essentially a high impedance or open circuit so that the feedback path is through conductor 225, resistor 230, conductor 233 to the base element 224 of transistor 226. Thus, with conductor 228 connected to ground whereby diode 223 is conducting there is maximum feedback and consequently the amplifier has low gain but when conductor 228 is removed from ground and the diode 223 is nonconducting there is very little feedback and the amplifier has its highest gain.

The AC output from amplifier 101 is supplied to the AC to DC demodulator 240 which may be of the vibrator type. The DC output from demodulator 240 is supplied to gain control 106, thence to conductor 107, high pass network 108 such as a capacitor-resistor arrangement well known, aeroelastic network 110 as a resistor-capacitor arrangement to summing device 91. Summing device 91 is also supplied with a second control signal derived from lateral accelerometer 112 supplying an AC signal on conductor 113 to the bridge amplifier 114 which may incorporate or include a demodulator similar to demodulator 240 above. The output of such demodulator is supplied through gain control 118 having its output supplied to a lag network 120, which may be of the resistor-capacitor type, conductor 121 to algebraic summing device 91. Conductor 242 extending from summer or summing device 91 transfers a composite control signal herein referred to as (XΨA). While such composite control signal is used herein, it is clear that displacement type signals or other signals may be utilized or a combination of such signals may be also used. The composite control signal from summing device 91 is transmitted by conductor 242 to the summing device 152 FIGURE 2. The application of such control signal to a servoamplifier being considered understood from above, the application of the control signal to the monitoring arrangement will now be considered.

It is evident from FIGURE 2 that there are five corresponding buffer amplifiers 157, 172, 191, 201, and 211 receiving control signals and corresponding bistable or flip-flop devices 159, 174, 193, 203, and 213. Consequently due to the similarity in amplifiers and flip-flop devices, but one of the amplifiers and but one bistable device will be described in detail in connection with FIGURE 4. FIGURE 4 will illustrate the upper amplifier 157 and bistable device 159 of FIGURE 2, and in so doing it is evident that a control signal for amplifier 157 is derived from the A left and A right servomotor displacements. The servomotors when operated in response to movements of their transfer valves in addition to operating the differential linkage arrangement also operate a followup signal device supplying an AC signal in accordance with the direction and amount of displacement of said servomotors. These AC signals are supplied to summing transformer 150 and thence by a conductor 243 to buffer amplifier 157. Amplifier 157 is a transistor type AC amplifier having two stages with class A operation.

The buffer amplifier is redundant so that a single failure of the monitoring circuitry will not render the monitoring arrangement inoperative. The output of the amplifier 157 is supplied through a coupling transformer or output transformer 250 to bistable device 159. The bistable device is duplicated to increase reliability and but one of such memory devices or bistable device will be shown and described in detail.

Bistable device or flip-flop (FF) 159 utilizes transistors instead of vacuum tubes and when power is initially applied to the memory or bistable device, the arrangement is such that transistor 255 will be conducting and transistor 256 will be off. In the overall system operation, when transistor 255 is conducting the automatic stabilization system in consequence will be disengaged. Consequently, the bistable device 159 as is true of the other bistable devices must be cycled so that transistor 256 is conducting and transistor 255 is nonconducting. This is achieved by applying a bias to the base of transistor 256. Such bias on the base member of transistor 256 is supplied through a manually operable recycle switch 260 connected to a 28 volt DC supply and in turn when closed connecting such supply through resistor 261, 262 to the transistor base member as shown.

The output from memory device 159 is applied to terminal 264 FIGURE 5 of a combined AND/OR gate 265 having the OR section 162 and the AND section 196. With respect to FIGURE 5 rather than FIGURE 2 in section 196 there are AND input terminals 273, 274. The OR section input terminals are 275 and 264. It is evident that both 273, 274 of the AND section 162 comprise an input of the OR section 196. The output of the AND/OR switching logic 265 is applied through conductor 285 to the base of a power transistor 287 which controls the engage circuit of the servos. As in the case of the buffer amplifier and memory device, the AND/OR gate and power transistor are redundant so that a single failure will not disable the monitoring arrangement.

As stated, the primed letters indicate the normal state. Further to distinguish the inputs to the AND/OR gate 265 shown in detail in FIGURE 5 from that merely shown in the block diagram FIGURE 2 as a redundant device, the inputs have been given the subscript 1. Thus the normal or unfailed inputs to the AND/OR gate 265 are $C'_1$; $E'_1$; and $A'_1$. $A'_1$ corresponds with the output from flip-flop 159, $C'_1$ corresponds with the output of flip-flop 193, and $E'_1$ is the output from flip flop 203. Similarly the AND/OR gate 288 in the normal state supplies an output to power transistor 289. Thus in the normal state, and with selectively operable switch 290 in closed position, a circuit is completed from the +28 volt source, switch 290, relay winding 291, through the power transistors 287, 289 to ground to energize relay winding 291.

Energization of relay winding 291 raises relay armatures or movable contactors 293, 294, 295. As operated, movable contact 293 closes a circuit from the 28 volt source through a winding 296 corresponding to the operating means 66 of the solenoid valve 65 in the aforesaid patent 2,952,424 to Schurr. Similarly operation of relay arm 294 closes a circuit through a winding 297 of the A left rudder servomotor solenoid valve corresponding to the valve of the A right rudder servomotor above. Thus in normal operation, the left and right rudder servomotors of the A channel or section of the stabilization system are in condition or effective for operation under the control of their transfer valves in turn controlled by the signal section of FIGURE 3. Additionally upon operation of relay arm 295 a circuit is completed from the 28 volt supply to switch 290, relay arm 295, closed switch arm 300, relay winding 303, to ground effecting operation of relay arm 304 connetcing conductor 228 of the amplifier shown in FIGURE 3 to signal ground thereby maintaining the normal or reduced gain of amplifier 225.

If we consider the *engage* equation of FIGURE 5 to be $F'_A = A'_1 \ C'_1 + A'_1 \ E'_1$ where $F'_A$ represents the engagement of channel A and plus indicates an OR condition then it is apparent that if we have in the normal state $A'_1$, for example no output on 161, along with either $C'_1$ or $E'_1$ the system will remain engaged; however, if $A'_1$ is lacking then even if $C'_1$ and $E'_1$ be present the system will not remain engaged. Stating it in the *disengage* form of the equation $F_A = A_1 + C_1E_1$, if $A'_1$ changes to $A_1$ the system will be disengaged or if $C'_1$ and $E'_1$ are simultaneously changed to $C_1$ and $E_1$ the system will be disengaged.

The yaw logic override switch 305 which is provided for the A and B channels, as indicated in FIGURE 5 by the pertinent indicia, may be operated to apply a 28 volt bias to the base members of the power transistors 287, 289 to maintain the system engaged.

While merely the A channel of the yaw stabilization system has been described in detail, it is evident that a similar arrangement would be provided for the B channel for controlling the power switch 181 in a manner similar to which the power switch 164 of the A channel is controlled. Similarly from the above a monitoring arrangement for power switch 209 of FIGURE 2 relating to the M or monitoring channel to control various light circuits would be provided.

When initially engaging the yaw stabilization system, it is evident that the left and right A channel servomotors 50, 60 have similar displacements since they are spring centered on disengagement so that the output of summer 150 FIGURE 2 will be zero. Therefore the flip-flop 159 after being recycled to zero by the pilot as by switch 260 FIGURE 4 has a normal output $A'$.

If the control signals from the flight condition sensors of the A channel and the B channel are the same, there will be no signal input to flip-flop 193 which will have, after being recycled, a normal output $C'$. If the signal output of the A channel and the M channel from their respective flight condition sensors are the same, there will similarly be a normal output $E'$ from flip-flop 203, and at this time closing of switch 290 FIGURE 5 will result in energization of power switch 164 and the energization of the solenoid windings 296, 297 engaging or rendering effective for operation the left and right rudder servomotors. Further control or operation is thereafter provided by their respective pilot valves or transfer valves as in the Schurr Patent 2,952,424. If other than a normal state output is supplied from flip-flop 159 FIGURE 2 to the OR gate 162 the system will remain unengaged or will be disengaged if previously engaged.

Further explanation of FIGURE 5 relating to the AND/OR gate 265 that is comprised of OR gate 162 and AND gate 196 in FIGURE 2, perhaps is desirable. FIGURE 2 is set up on the logic failure equation for the A channel: failure equals $A+CE$ which interpreted means that a failure will occur upon the presence of $A$ instead of $A'$. Failure will also occur upon the simultaneous occurrence of $C$ instead of $C'$ along with $E$ instead of $E'$. However failure will not occur if $A'$ is present along with either $C'$ or $E'$ present.

In FIGURE 5 it is apparent that diodes 310 will conduct if either $C'_1$ or $E'_1$ be present on terminals 273, 274 and thus diodes 310 are the OR gate diodes. Further, the conduction through diodes 311 depends upon $A'_1$ and the condition of $C'$ and $E'$. Therefore diodes 311 constitute the AND gate. Consequently if $A$ instead of $A'_1$ is applied to terminal 264 the AND gate comprising diodes 311 will not be effective. However, if $A'_1$ indicating no error be applied to terminal 264 and if either $C'_1$ or $E'_1$ indicating no error to one terminal be applied to terminals 273 or 274, diodes 311 will be effective and the AND gate is operative to retain the stabilization system engaged.

It will now be evident that there has been provided a novel monitoring and interlock arrangement for an automatic yaw stabilization system which upon the presence of a differential in operation of a left and right servomotor will effect the disengagement or render ineffective the further operation of the two rudder surfaces from their respective servomotors except from automatic centering and wherein such monitoring arrangement, control signals derived from aircraft flight response are compared so that if one signal device arrangement out of three signal device arrangements sensing a similar flight condition has a different response, the two servomotors will also be rendered ineffective. When the servomotors are thus disengaged or rendered ineffective, two other servomotors operating the same surface have the gain in their control systems automatically increased to provide similar operation of each rudder surface as if the two servomotors connected to each surface were operating as normal.

Although but one embodiment of the invention has been illustrated and described in detail, it is to be understood that the invention is not limited thereto and that various changes can be made in the design and arrangement of the parts without departing from the spirit and scope of the invention except as limited by the subjoined claims.

What is claimed is:

1. In an actuation system having a plurality of output members and a plurality of individually operative servomotors, arranged in pairs, the two servomotors in each individual pair being further arranged in series relation whereby their respective operations are algebraically combined and applied to an output member; an individual control means for each servomotor; further means responsive to joint operation of a servomotor in each pair and thus to more than one servomotor and effective on dissimilarily in operation of the servomotors connected to the further means rendering only such servomotors inoperative on its output members.

2. The apparatus of claim 1, wherein the individual control means of the servomotors connected to the same further means are responsive to a common control signal.

3. The apparatus of claim 2, wherein the effective further means alters the gain of the control means of the servomotor of each pair not rendered inoperative, to provide full displacement of the output members, dependent on the control signal.

4. The apparatus of claim 1 wherein the operation of each servomotor is applied in feedback relation to the control means of the servomotor.

5. The apparatus of claim 1, and additional means responsive to operation of the other servomotor in each pair and thus to a plurality of servomotors and effectve on dissimilarity in operation of the servo motors connected to the additional means rendering all of such other servomotors inoperative.

6. The apparatus of claim 5 with the individual control means of the servomotors connected to the additional means being responsive to a common control signal, and means responsive to the same condition providing each of the two common control signals.

7. The apparatus of claim 2, three sensing devices each responsive to the same condition and each providing a signal, one sensing device thus supplying one common control signal for one servomotor in each of two pairs, a second device supplying a second common control signal for the control means of two other servomotors in each of two pairs, and the third device also supplying a control signal, combining means forming two different pairs from the signals of the three devices whereby two signals in each pair is separately summed, and further combining means jointly responsive to the combined signals from both different pairs, preventing operation of one output member when one common signal is different from another.

8. Control apparatus for operating a right and left control surface of an aircraft, each surface being operated by a differential arrangement wherein each differential arrangement includes two series servomotors, in combination: two sensing devices each responsive to the same flight condition of the aircraft; means controlling one servomotor in each differential arrangement from one sensing device and controlling the other servomotor in each differential arrangement from the other sensing device; means comparing the operation of the two servomotors controlled from the same sensing device; and means responsive to dissimilarity in operation of the particular servomotors compared rendering such servomotor ineffective in their respective differential arrangements.

9. The apparatus of claim 8 and a third sensing device responsive to the same flight condition and each device providing a control signal, means forming three distinct pairs from the three signal devices and thus providing three separate summations from the signals of the devices in each of said three pairs, two switching logic AND gates, means for controlling both switching logic AND gates from a common summation signal and also controlling each AND gate from a different one of the three summation of signals, and means responsive to operation of one AND gate due to a difference in the two summation of signals applied thereto rendering one servomotor in each differential arrangement ineffective, and further means responsive to similar operation of the other switching logic AND gate rendering operation of the other servomotor in each differential arrangement ineffective.

10. The apparatus of claim 1 wherein the further means comprise a bistable device operative to a second condition upon dissimilarity in operation of the two servomotors connected to the further means.

11. The apparatus of claim 10 wherein each servomotor is of the linear hydraulic type including an electrohydraulic engage valve effective to condition a main actuator piston in such hydraulic servomotor for operation and wherein such engage valve is controlled by said further means.

12. In an actuation system having a plurality of output members and a plurality of individually operative linear hydraulic servomotors rendered effective or ineffective for operation in accordance with the energization of a solenoid valve, each servomotor when rendered ineffective being centered and locked, the hydraulic servomotors being arranged in pairs and the two servomotors in each individual pair being further arranged in series relation whereby their respective operations are algebraically combined and applied to an output member, in combination: an individual control means for each hydraulic servomotor effecting displacement of a control valve thereof to cause operation of such servomotor; further means responsive to joint operation of one servomotor in each pair and thus to more than one servomotor and effective on dissimilarity in operation of the servomotors connected to the further means controlling the solenoid valve of both such servomotors thereby rendering said servomotors ineffective on their output members.

13. In control apparatus for an aircraft having a plurality of operable control surfaces and a plurality of individually operative hydraulic type servomotors rendered effective or ineffective for operation by respective solenoid valves each servomotor with its solenoid valve deenergized being biased to a normal centered position, the hydraulic servomotors being arranged in pairs and the servomotors in each individual pair further being arranged in series relation whereby their respective operations are algebraically combined and applied to a control surface, in combination: an individual signal controlled amplifier controlling operation of each servomotor; further means responsive to joint displacement of a servomotor in each pair and thus to more than one servomotor and effective on dissimilarity in operation of the servomotors connected to the further means operating the solenoid valves of such servomotors thereby rendering such servomotors in each pair inoperative on the control surfaces.

14. In a yaw stability augmentation apparatus for an aircraft having two operable rudder control surfaces and a plurality of individually operable hydraulic type servomotors rendered effective or ineffective for operation by the respective solenoid valve for each servomotor, each servomotor with the solenoid valve deenergized being biased to a normal centered position and wherein the hydraulic servomotors are arranged in pairs and the servomotors in each individual pair are further arranged in a series relationship whereby their respective operations are algebraically combined and applied to one rudder surface, in combination: means including a common bridge amplifier controlling the operation of each servomotor in each pair; further means responsive to joint displacement of a servomotor in each pair and thus to more than one servomotor and effective on dissimilarity in operation of the two servomotors connected to the further means controlling the solenoid valves of such servomotors thereby rendering such servomotors in each pair inoperative on the control surfaces and additional means controlled by the further means increasing the gain in the bridge amplifier for each pair of servomotors not rendered inoperative.

15. In a yaw stability augmentation apparatus for an aircraft having two operable rudder control surfaces, a plurality of individually operable servomotors, the servomotors being arranged in pairs and the servomotors in each individual pair being arranged in series relationship whereby their respective operations are algebraically combined, one pair of servomotors operating one rudder surface and another pair of servomotors operating the other rudder surface, in combination: three control signal channels each comprising a similar device for sensing yaw rate of the craft, a bridge amplifier, one channel being designated an A channel, a second a B channel, and a third a monitoring channel wherein further the bridge amplifier in the A channel controls one servomotor in each of said pairs of servomotors and the bridge amplifier in the B channel controls another servomotor in each pair of servomotors, and means responsive to dissimilarity in operation of the two servomotors controlled by the A or B channel rendering ineffective operation of such servomotors and increasing the gain of the bridge amplifier controlling the other two servomotors.

References Cited
UNITED STATES PATENTS

| | | | |
|---|---|---|---|
| 3,054,039 | 9/1962 | Meredith | 244—77 X |
| 3,071,336 | 1/1963 | Fearnside | 244—77 |
| 3,156,855 | 11/1964 | Righton et al. | 244—77 X |

FERGUS S. MIDDLETON, *Primary Examiner.*